Figure 1:
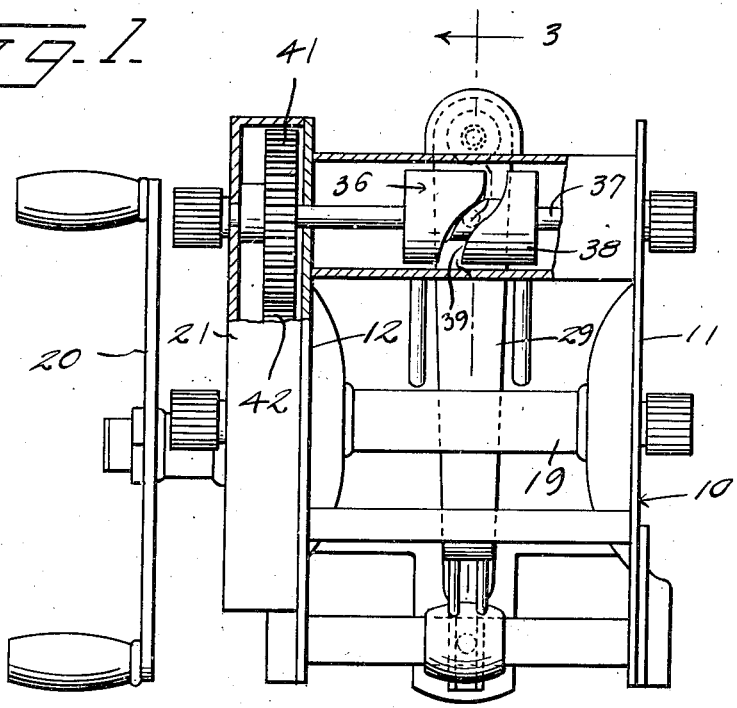

Feb. 15, 1949. L. S. ELSINGER 2,461,884
LEVEL WIND FOR FISHING REELS
Filed Jan. 3, 1946 2 Sheets-Sheet 1

Inventor
L. S. Elsinger
By Kimmel & Crowell Attorneys

Feb. 15, 1949. L. S. ELSINGER 2,461,884
LEVEL WIND FOR FISHING REELS
Filed Jan. 3, 1946 2 Sheets-Sheet 2
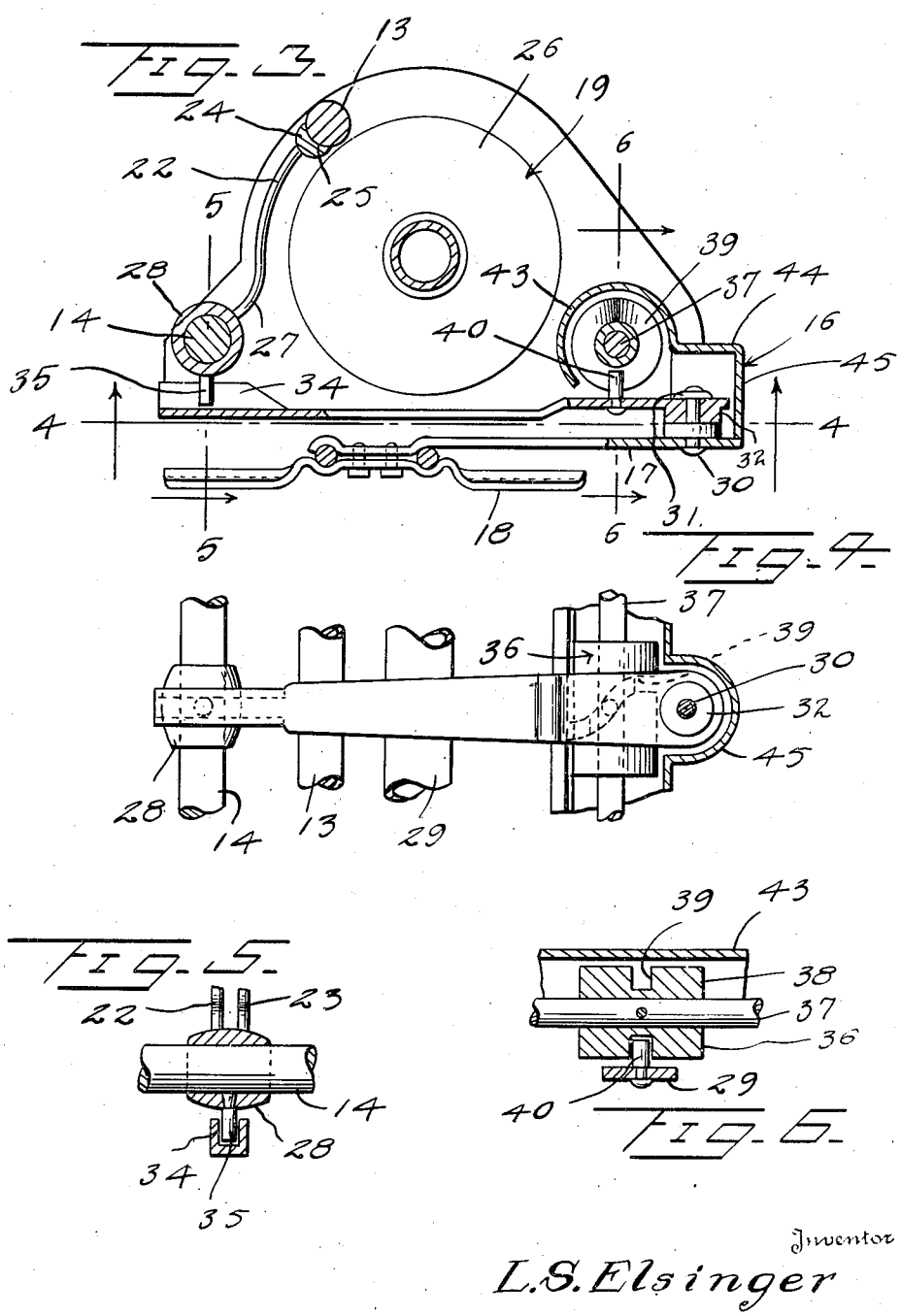
Inventor
L. S. Elsinger
By Kimmel & Crowell Attorneys Patented Feb. 15, 1949

2,461,884

UNITED STATES PATENT OFFICE 2,461,884

LEVEL WIND FOR FISHING REELS

Louis S. Elsinger, Tampa, Fla.; J. E. Gillen trustee in bankruptcy of said Louis S. Elsinger Application January 3, 1946, Serial No. 638,848

3 Claims. (Cl. 242—84.4)

This invention relates to fishing reels.

An object of this invention is to provide an improved means for level winding the fish line on the spool or drum.

Another object of this invention is to provide in a reel a laterally movable line guide, and means coupled to the spool driving mechanism for shifting the guide back and forth so that the line will be evenly wound on the spool.

A further object of this invention is to provide in a reel construction a horizontally rockable lever which is loosely coupled to the line guide and a rotatable lever operator which is gear coupled to the spool mechanism for rocking the lever simultaneously with rotation of the spool.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

Figure 2:
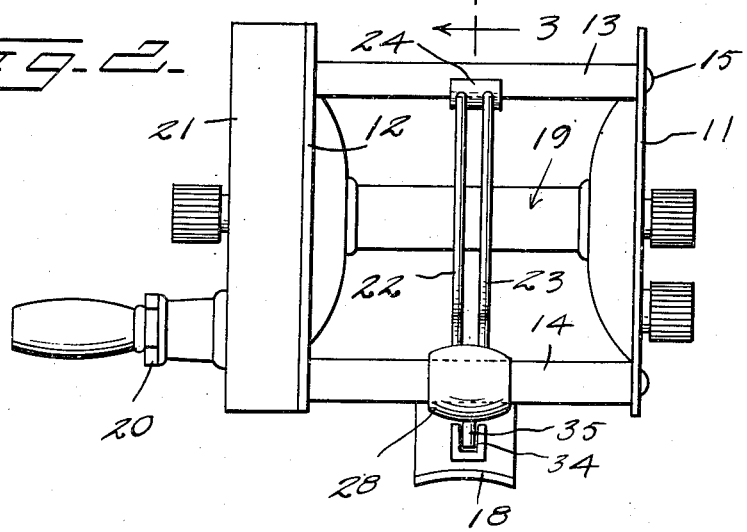

In the drawings:

Figure 1 is a detailed top plan of a fishing reel partly broken away and in section having a level winding means mounted thereon constructed according to an embodiment of this invention, Figure 2 is a detailed front elevation of the reel, Figure 3 is a sectional view taken on the line 3—3 of Figure 1, Figure 4 is a fragmentary sectional view taken on the line 4—4 of Figure 3, Figure 5 is a fragmentary sectional view taken on the line 5—5 of Figure 3, and Figure 6 is a fragmentary sectional view taken on the line 6—6 of Figure 3.

Referring to the drawings, the numeral 10 designates generally a fishing reel frame embodying opposite side members 11 and 12, which are connected together by spaced bars 13 and 14 secured to the side members 11 and 12 by fastening means 15. The side members 11 and 12 also have fixed therebetween a rear spacer member generally designated as 16. The spacer member 16 includes a forwardly projecting plate 17 having a pair of transversely arcuate ears 18 which are engaged with the rear portion of the fishing pole for securing the reel structure upon a pole. The frame 10 has rotatably mounted between the side members 11 and 12 thereof a winding spool 19. The spool 19 is gear coupled to a crank 20, the gears for rotating the spool 19 being mounted in a housing or cover 21 secured to the outer side of the side member 12.

A pair of spaced apart parallel line guiding bars 22 and 23 are disposed at the forward side or end of the frame 10 being fixedly secured at their upper ends to a sliding block 24, which is formed with a concave upper surface 25 which slidably contacts with the connecting member 13. The bars 22 and 23 are longitudinally bent, as shown in Figure 3, being curved to substantially the same curvature as the ends 26 of the spool 19 and the lower or forward ends of the bars 22 and 23 are downwardly and outwardly bent as indicated at 27. The lower or forward ends of the bars 23 and 24 are fixedly secured to a sliding sleeve 28 which is loosely mounted on the connecting member 14. The fishing line is adapted to loosely engage between the two bars 22 and 23, so that when the bars are laterally shifted between the side members of the frame the line will be drawn therewith so that the line will be evenly wound in even layers upon the spool 19.

In order to provide for lateral shifting of the guide as the spool 19 is rotated, I have provided a guide shifting lever 29. The lever 29 is pivotally mounted on a pivot member 30, which extends upwardly through the plate 17. The upper side of the plate 17 has a shouldered stud or pivot 31 which engages the boss 32 which is fixed to lever 29. Said stud or pivot 30 is riveted to plate 17 by means of a downwardly projecting cylindrical extension which passes through part 17 and is riveted or headed against the lower side thereof. By removing screws, parts 17 and 18 become easily disengaged from 13 and 14 shoulders and then lever 29 together with boss 31 and plate 17 with pivot or stud 30 may be rearwardly withdrawn as an assembled unit while part 18 falls away. The lever 29 at its forward end is provided with a slot 34 within which a downwardly extending pin 35 which is fixed to the sliding sleeve 28 is adapted to loosely engage. In this manner as the lever 29 is rocked horizontally on the pivot 30, the guide bars 22 and 23 will be laterally shifted on the guide or frame member 14. The lever 29 is rocked back and forth with rotation of the spool 19 by means of a cam, generally designated as 36. The cam 36 is mounted on a shaft 37 journaled transversely of the frame 10 and the cam member 36 is formed of a cylindrical body 38 having a cam track 39 formed therein.

The lever 29 has secured to the upper side thereof a roller pin 40 which engages in the cam track 39, so that upon rotation of the cam 36 the lever 29 will be rocked to laterally shift the line guiding bars. The shaft 37 has fixed to one end thereof a gearing 41 disposed in the housing or cover 21 and meshing with the gear train 42 connected with the crank 20 and the spool 19. The gear train 42 is of conventional construction and may embody two or more gears for rotating the spool 19 at the desired speed with rotation of the crank 20. The cam 36 and the shaft 37 are substantially enclosed by a transversely arcuate cover or shield 43 which extends between the two side members 11 and 12 and the shield 43 is formed with a substantially V-shaped apron 44 extending rearwardly therefrom in a horizontal or sloping plane. The apron 44 has extending downwardly therefrom a flange 45 which may be secured to or formed integral with the plate 17.

In the use and operation of this device the fishing line is threaded between the two guide bars 22 and 23 and one end is then secured to the winding spool 19. As the crank 20 is rotated the spool 19 will rotate therewith and as the latter rotates shaft 37 with cam 36 will rotate through the gear coupling 41. As cam 36 rotates the lever 29 will be rocked back and forth in a horizontal plane and will move with the slide 28 and the concave guiding surface 25 carried by the block 24 will hold the upper ends of the guide bars 22 and 23 against vertical rocking while permitting free lateral shifting thereof. The gear ratio between the gear 41 and the gear train 42 is preferably such as to provide for the complete filling of the length of the spool 19 in one layer during one lateral movement of the line guide structure. When the line structure moves on the return movement thereof the line will be laid on the spool in a succeeding layer.

The exact configuration illustrated is regarded as the optimum, but some of the desirable results inherent in this disclosure may be obtained by various slight modifications including some departure from the exact configuration shown, and it is therefore requested that the scope of the invention should be regarded as limited only by the terms of the claims.

What I claim is:

1. In a fishing reel comprising a pair of side members and a winding spool rotatably mounted between said side members, a level winding means comprising a pair of spaced apart parallel bars, means slidably supporting said bars between said end members longitudinally of said spool on the forward side thereof, a rock lever underlying said spool, a rotatable grooved cam carried by said reel opposite said spool from said bars, and means operatively connecting said rock lever to said cam and said bars for sliding said bars upon rotation of said cam.

2. In a fishing reel comprising a lower plate, a pair of side members on opposite sides of said plate, and a winding spool rotatable between said side members, a line guiding member, means slidably supporting said member for movement along the length of said spool on one side thereof, a rotatable grooved cam between said side members on the opposite side of said spool, a rock lever on said plate and underlying said spool, means carried by said sliding member engaging one end of said lever, and means carried by said lever engaging said grooved cam for rocking said lever upon rotation of said cam thereby effecting sliding movement of said line guide member along the length of said spool.

3. In a fishing reel comprising a lower plate, a pair of side members on said plate, a winding spool rotatably mounted between said side members, and gear means for rotating said spool, a rock lever underlying said spool, means pivotally securing one end of said lever on said lower plate, a grooved cam rotatably mounted between said side members on one side of said spool, a pin fixed on said lever intermediate the length thereof engaging said cam in the groove therein, a slotted member on the other end of said lever, a line guide member on the other side of said spool, means slidably mounting said line guide member for sliding movement along the length of said spool, a pin carried by said line guiding member engaging in said slotted member, and means operatively connecting said cam to said gear means whereby rotation of said spool will effect rotation of said cam, rocking of said lever and sliding of said line guide member.

LOUIS S. ELSINGER.

REFERENCES CITED

The following references are of record in the file of this patent:

UNITED STATES PATENTS

| Number | Name | Date |
| --- | --- | --- |
| 583,913 | Kruschke | June 8, 1897 |
| 828,969 | Rhodes | Aug. 21, 1906 |
| 1,507,404 | Welch | Sept. 2, 1924 |
| 2,377,996 | Coleman | June 12, 1945 |